US012495233B2

(12) United States Patent
Kudekar et al.

(10) Patent No.: US 12,495,233 B2
(45) Date of Patent: Dec. 9, 2025

(54) AUDIO TRANSDUCER SYSTEMS FOR ELECTRONIC DEVICES WITH DISPLAYS

(71) Applicant: Apple Inc., Cupertino, CA (US)

(72) Inventors: Aneesh R. Kudekar, Campbell, CA (US); Chang-Jiang Chen, Cupertino, CA (US); Mohammad Reza Esmaeili Rad, San Jose, CA (US); Stuart M. Nevill, Los Gatos, CA (US); Youchul Jeong, Cupertino, CA (US); Yanghee Kim, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 18/233,864

(22) Filed: Aug. 14, 2023

(65) Prior Publication Data

US 2025/0063282 A1 Feb. 20, 2025

(51) Int. Cl.
*H04R 1/02* (2006.01)
*H04R 9/02* (2006.01)
*H04R 9/06* (2006.01)

(52) U.S. Cl.
CPC ............. *H04R 1/028* (2013.01); *H04R 9/025* (2013.01); *H04R 9/06* (2013.01)

(58) Field of Classification Search
None
See application file for complete search history.

(56) References Cited

U.S. PATENT DOCUMENTS

| | | | | |
|---|---|---|---|---|
| 5,920,637 | A | 7/1999 | Jeon | |
| 7,529,376 | B2 | 5/2009 | Konagai | |
| 2009/0279721 | A1 | 11/2009 | Tanaka | |
| 2013/0058519 | A1* | 3/2013 | Wilk | H04R 9/046 381/387 |
| 2016/0205479 | A1* | 7/2016 | Tomar | H04R 9/063 381/398 |
| 2018/0329461 | A1* | 11/2018 | Hernandez Santisteban | G06F 1/1616 |
| 2020/0213699 | A1* | 7/2020 | You | H04R 7/045 |
| 2021/0020153 | A1* | 1/2021 | Reining | H04R 9/025 |
| 2021/0029464 | A1* | 1/2021 | Pan | H04R 9/04 |
| 2021/0389923 | A1* | 12/2021 | Hwang | F16M 11/125 |
| 2022/0174445 | A1* | 6/2022 | So | H04S 7/30 |
| 2022/0248101 | A1* | 8/2022 | Lindholm | H04N 21/47202 |
| 2022/0286782 | A1* | 9/2022 | Liu | H04R 9/025 |
| 2023/0007374 | A1* | 1/2023 | Zhou | H04R 9/025 |
| 2024/0147156 | A1* | 5/2024 | Huang | H04R 9/063 |
| 2024/0348981 | A1* | 10/2024 | Yang | H04R 9/045 |
| 2025/0008270 | A1* | 1/2025 | Gong | H04R 9/06 |

* cited by examiner

*Primary Examiner* — Qin Zhu
(74) *Attorney, Agent, or Firm* — BAKERHOSTETLER

(57) ABSTRACT

Aspects of the subject technology relate to electronic devices having speakers. An electronic device may operate a pair of speakers to in a way that mitigates electromagnetic interference with a display of the electronic device. For example, the speakers may be operated acoustically and mechanically in phase, and electrically out of phase, to mitigates interference with a display of the electronic device.

22 Claims, 7 Drawing Sheets

AUDIO TRANSDUCER SYSTEMS FOR ELECTRONIC DEVICES WITH DISPLAYS

TECHNICAL FIELD

The present description relates generally to electronic devices, including, for example, audio transducer systems for electronic devices with displays.

BACKGROUND

Electronic devices such as computers, media players, cellular telephones, wearable devices, and headphones are often provided with speakers for generating audio output from the device and microphones for receiving audio input to the device. However, as devices are implemented in ever smaller form factors, it can be challenging to integrate speakers into electronic devices, particularly in compact devices such as portable electronic devices.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, tablet computers, laptop computers, wearable devices such as smart watches, headphones, earbuds, other wearable devices, and the like, often include one or more audio transducers such as one or more microphones for receiving sound input, and/or one or more speakers for generating sound. However, challenges can arise in implementing audio transducers such as speakers into compact electronic devices in which space may be limited for the audio transducers and other components, such as displays, of the electronic devices.

In accordance with aspects of the subject disclosure, an audio transducer system, such as a speaker system, for an electronic device, mitigates electromagnetic interference with a display of the electronic device. For example, a speaker system may include a first speaker and a second speaker that are both mounted adjacent to a data line of the display (e.g., a conductive element configured to carry data signals to display pixels of the display). The first speaker and the second speaker may be operated acoustically and mechanically in phase, while being electrically out of phase (e.g., one-hundred-and-eighty degrees out of phase). In one or more implementations, this can be achieved by providing the first speaker and the second speaker with speaker magnets (e.g., permanent magnets) that are reversed in magnetic polarity. A speaker control current may then be provided through the voice coils of the first speaker and the second speaker in opposite directions, to operate the first and second speakers to generate sound. In one or more other implementations, rather than providing different currents, the windings of the voice coil of the first speaker can be wound in an opposite direction to a direction of the windings of the voice coil of the second speaker.

Figure 1:
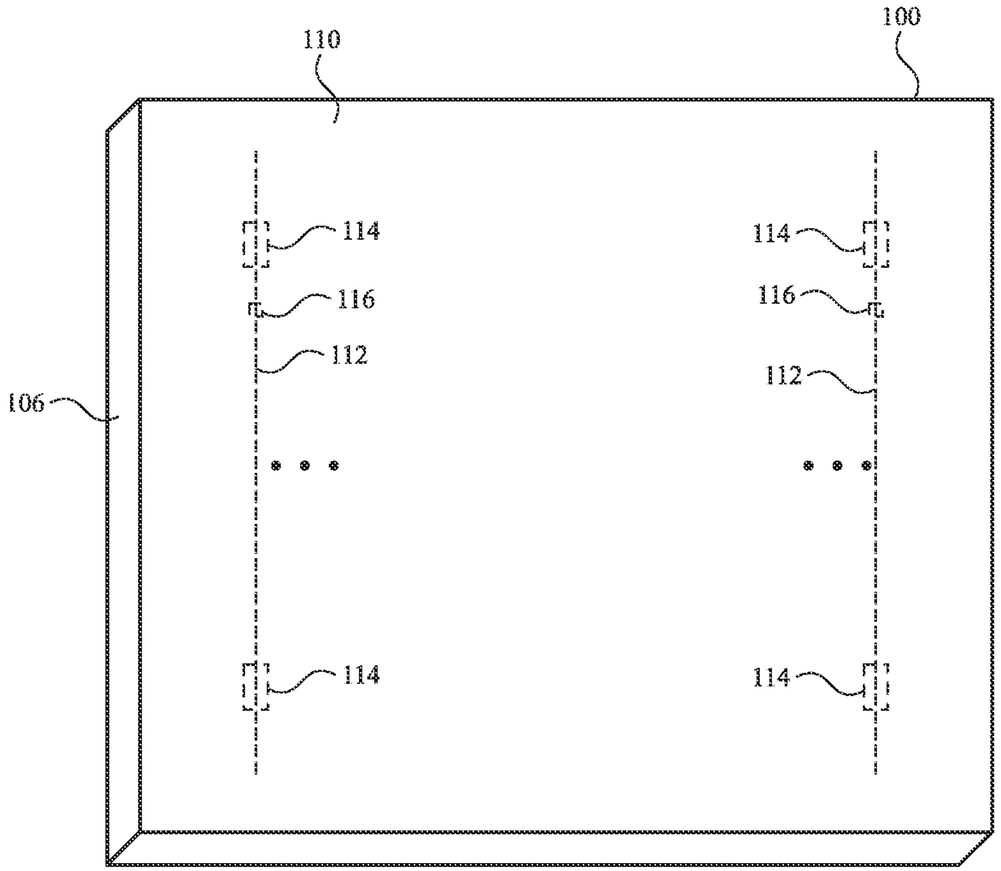
FIG. 1 illustrates a perspective view of an example electronic device having a display and one or more speakers in accordance with various aspects of the subject technology.

An illustrative electronic device is shown in FIG. 1. In the example of FIG. 1, electronic device 100 includes a display such as display 110 mounted on the front of a housing 106. Electronic device 100 may include one or more input/output devices such as a touch screen incorporated into display 110, a button, a switch, a dial, a crown, a keyboard, and/or other input and/or output components disposed on or behind display 110 or on, behind, or within other portions of housing 106. Display 110 and/or housing 106 may include one or more openings to accommodate a button, a speaker, a light source, or a camera (as examples).

In the example of FIG. 1, the electronic device 100 includes multiple speakers 114 disposed within the housing 106 (e.g., behind the display 110). For example, the speakers 114 may be oriented to project sound through the display 110, through one or more openings in the display 110, and/or through one or more openings in the housing 106.

In the example of FIG. 1, the display 110 includes multiple data lines 112 that are each configured to carry display data signals for operating one or more display pixels 116 of the display that are connected to that data line 112. For example, data lines 112 may be conductive traces or other conductive physical pathways that carry data signals to display pixels 112 of the display 110, for operation of the display pixels 112 to generate display content on the display 110. Although not shown in FIG. 1, it is understood that the display 110 may also include one or more other control lines, such as address lines, that connect to the display pixels 116 and are arranged substantially perpendicularly to the data lines 112. As shown in FIG. 1, in one or more implementations, two speakers 114 may be disposed adjacent to (e.g., behind or under) each of one or more of the data lines 112. In this example, two speakers 114 are disposed adjacent to a first one of the data lines 112 on a left side of the electronic device 100, and two speakers 114 are disposed adjacent to a second one of the data lines 112 on the right side of electronic device 100. In other examples, more than two speakers (e.g., multiple pairs of speakers) may be disposed adjacent to one or more data lines 112.

In one or more use cases, the speakers 114 may be configured to output a stereo (or spatial) output in which the two speakers 114 disposed adjacent to the first one of the data lines 112 on the left side of the electronic device 100 output a first channel (e.g., a left channel) of the stereo (or spatial) output, and the two speakers 114 disposed adjacent to the second one of the data lines 112 on the right side of the electronic device 100 output a second channel (e.g., a right channel) of the stereo (or spatial) output.

In the example of FIG. 1, electronic device 100 may be implemented using a housing that is sufficiently small to be portable and carried or worn by a user (e.g., electronic device 100 of FIG. 1 may be a handheld electronic device such as a tablet computer or a cellular telephone or smart phone or a wearable device such as a smart watch, a pendant device, a headlamp device, or the link). However, the configuration of electronic device 100 of FIG. 1 is merely illustrative. In other implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. As discussed herein, in some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
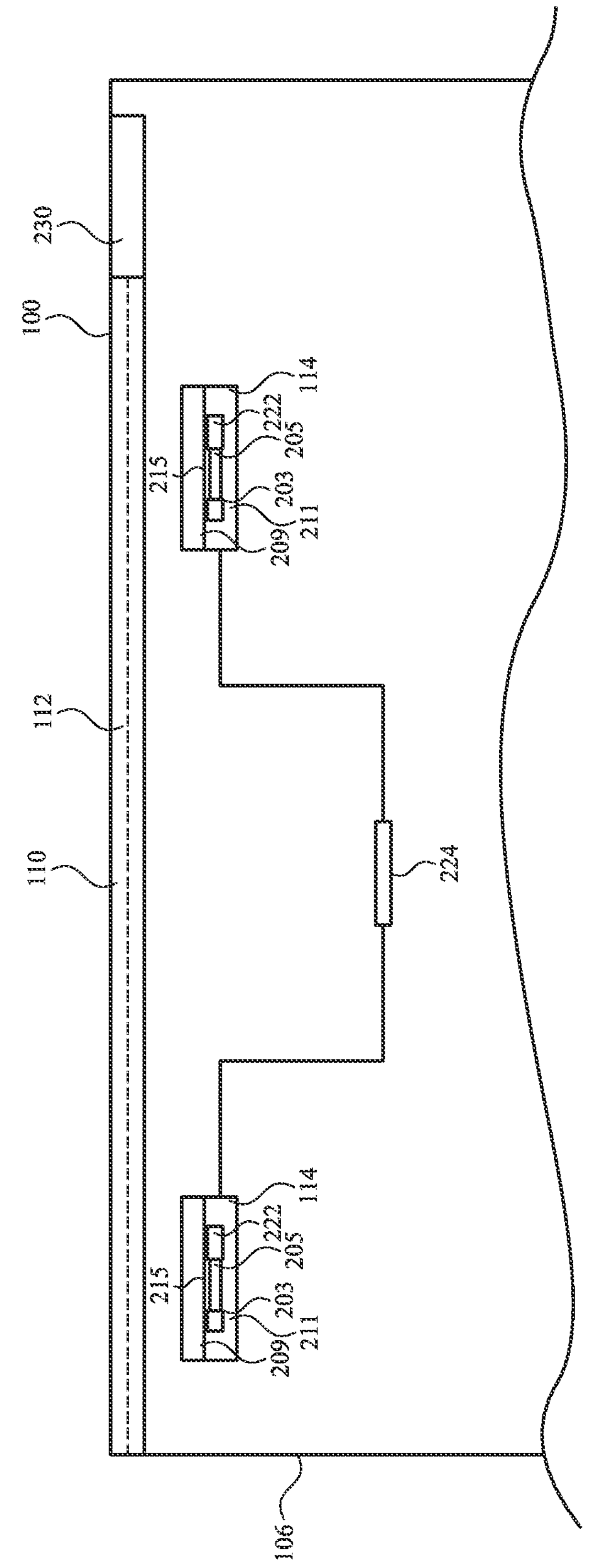
FIG. 2 illustrates a cross-sectional view of a portion of an example electronic device having a display and one or more speakers in accordance with various aspects of the subject technology.

FIG. 2 illustrates a cross-sectional side view of a portion of the electronic device 100 of FIG. 1. In the example of FIG. 2, two speakers 114 are shown adjacent to one of the data lines 112 in the display 110. As shown in FIG. 2, the data line 112 may be coupled to display circuitry 230 (e.g., a display data driver) of the display 110. The data line 112 may carry a data signal generated by the display circuitry 230 to one or more display pixels of the display 110 (e.g., responsive to receiving display content for display from other device circuitry of the electronic device 100).

As shown in FIG. 2, each of the speakers 114 may include a front volume 209 and a back volume 211. The front volume 209 and the back volume 211 may be separated by a sound-generating component 215 (e.g., a diaphragm or an actuatable component of a microelectromechanical systems (MEMS) speaker). In one or more implementations, the sound-generating component 215 may be mechanically coupled to the voice coil 203, so that, when the voice coil 203 moves (due to interaction of the fields generated by currents in the voice coil with the magnetic field the magnet 205), the sound-generating component 215 is moved to generate sound.

As shown, the sound-generating component 215 of each of the speakers 114 in FIG. 2 are oriented in the same direction, to generate audio outputs (e.g., project sound) in the same direction (e.g., toward and/or through the display 110). In one or more implementations, the speakers 114 may be mounted within fifty millimeters (e.g., within twenty millimeters, within ten millimeters, within two millimeters, or within one millimeter of the display 110). In one or more implementations, the speakers 114 may be mounted to the display 110 or may be mounted to another internal structure of the electronic device 100 and separated from the display 110 by an air gap.

In the example of FIG. 2, each of the speakers 114 includes speaker circuitry 222. As discussed hereinafter in further detail, the speaker circuitry 222 may include, for example, a voice coil 203, a magnet 205, and/or other speaker circuitry. In one or more implementations, the electronic device 100 may also include other circuitry, such as device circuitry 224. Device circuitry 224 may include one or more processors, memory, acoustic components, haptic components, mechanical components, electronic components, or any other suitable components of an electronic device. In one or more implementations, the device circuitry 224 may also include one or more sensors, such as an inertial sensor (e.g., one or more accelerometers, gyroscopes, and/or magnetometers), a heart rate sensor, a blood oxygen sensor, a positioning sensor, a microphone, and/or the like. In one or more implementations, the device circuitry 224 may include one or more amplifiers configured to provide control signals to the speakers 114 (e.g., by providing a modulated control current through the voice coils 203 of the speakers 114).

As shown, the speakers 114 may be mounted adjacent to the data line 112 of the display 110. Because the speaker circuitry 222 includes electromagnetic components (e.g., a magnet and a voice coil), operating the speakers 114 can generate electromagnetic fields that can disrupt and/or otherwise interfere with the data signals in the data lines 112. This electromagnetic interference can cause visible artifacts on the display 110 in some scenarios.

In accordance with aspects of the subject disclosure, the two speakers 114 that are mounted adjacent to the same data line 112 may be configured to mitigate electromagnetic interference with that data line 112 and/or the display 110. For example, the two speakers 114 that are mounted adjacent to the same data line 112 may be operated acoustically and mechanically in phase, and electrically out of phase. In this way, electromagnetic interference by one speaker 114 may be partially or completely cancelled by another speaker 114.

Figure 3:
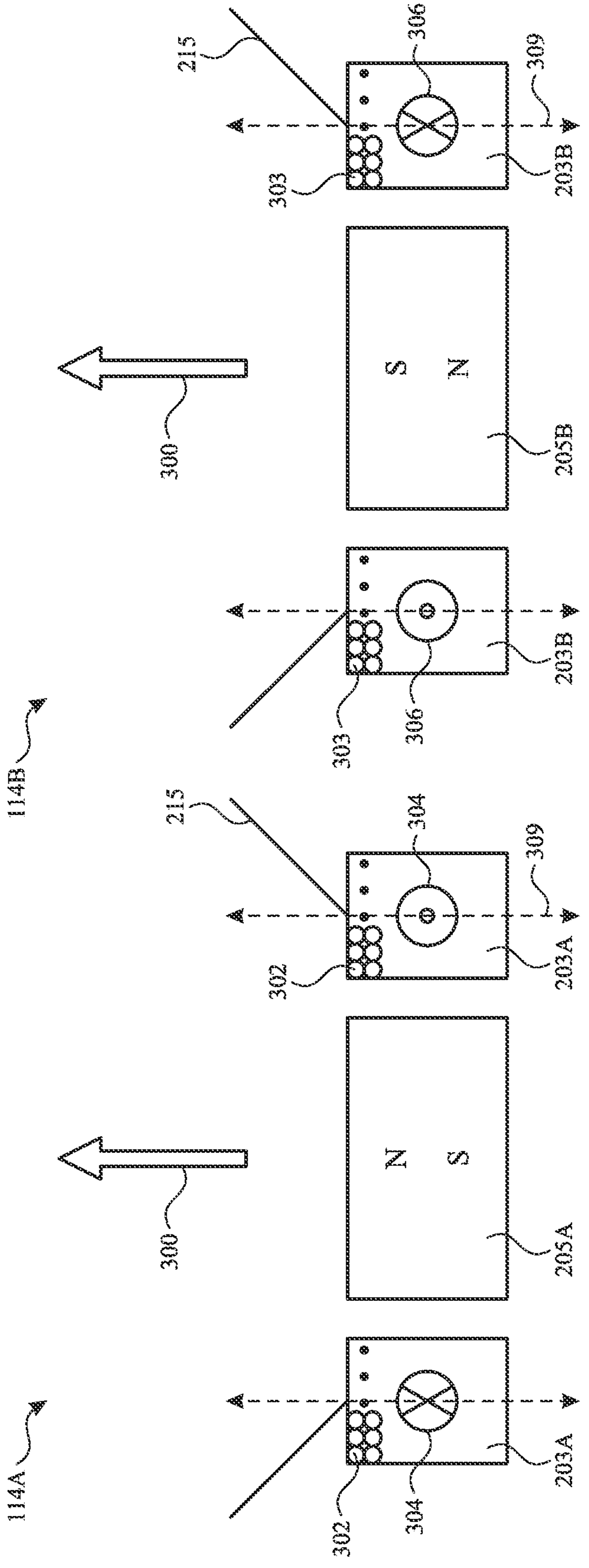
FIG. 3 illustrates example speakers of an electronic device in accordance with various aspects of the subject technology.

For example, as shown in FIG. 3, a first speaker 114A and a second speaker 114B may be oriented in the same direction 300. For example, in one or more implementations, the orientation of a speaker may be defined by a direction of motion 309 of a voice coil of the speaker (e.g., toward and away from a front of the speaker) and/or an orientation of a diaphragm of the speaker (e.g., which may control the primary direction of sound output by the speaker). For example, the sound-generation component 215, such as a diaphragm, of both the first speaker 114A and the second speaker 114B may be oriented in the same direction (e.g., in parallel), to project sound in substantially the same direction 300 (or in substantially parallel directions). For example, the diaphragm of each speaker may have an interior surface that faces the back volume 211 and an outer surface that faces the display 110. In one or more implementations, the orientation of the speaker may be defined by the direction in which the outer surface of the diaphragm faces. In one or more implementations, the direction of orientation of a speaker 114 may be defined as a direction extending through a center of the speaker and from the outer surface of the diaphragm toward the display 110.

As examples, the first speaker 114A and the second speaker 114B may represent the two speakers 114 of FIG. 2, which may represent the two rightmost speakers 114 of FIG. 1 or the two leftmost speakers 114 of FIG. 1 (e.g., two speakers 114 adjacent to the same data line 112). As shown, the first speaker 114A may have a first magnet 205A oriented in a first polar orientation, and the second speaker 114B may have a second magnet 205B oriented in a second polar orientation that is substantially opposite to the first polar orientation. For example, in FIG. 3, a north (N) pole of the first magnet 205A of the first speaker 114A may be disposed closer to a front of the first speaker 114A (e.g., closer to the sound-generating component 215) than the south(S) pole of the first magnet 205A, and a south(S) pole of the second magnet 205B of the second speaker 114B may be disposed closer to the front of the second speaker 114B (e.g., closer to the sound-generating component 215) than the south(S) pole of the second magnet 205B.

As shown, the voice coil 203A of the first speaker 114A may be formed by one or more windings of a wire 302, such that the first magnet 205A is disposed within the open bore of the coil formed by the windings of the wire 302. In order to actuate the sound-generating component 215 (see, e.g., FIG. 2) of the first speaker 114A, a control current (e.g., modulated according to the desired audio content to be output by the first speaker 114A) may be passed through the voice coil 203A (e.g., through the windings of the wire 302). The changing magnetic field within the coil induced by the control current, combined with the magnetic field of the first magnet 205A (e.g., which may be fixed in position), causes the voice coil 203A to move relative to the fixed position of the first magnet 205A. The sound-generating component 215 of the first speaker 114A may be mounted to or otherwise mechanically coupled to the voice coil 203A such that the motion of the voice coil 203A relative to the first magnet 205A cause the sound-generating component 215 to move and generate sound (e.g., project sound in the direction 300).

The voice coil 203B of the second speaker 114B may be formed by one or more windings of a wire 303, such that the second magnet 205B is disposed within the open bore of the coil formed by the windings of the wire 303. In order to actuate the sound-generating component 215 (see, e.g., FIG. 2) of the second speaker 114B, a control current (e.g., modulated according to the desired audio content to be output by the second speaker 114B) may be passed through the voice coil 203B (e.g., through the windings of the wire 303). The changing magnetic field within the coil induced by the control current, combined with the magnetic field of the second magnet 205B (e.g., which may be fixed in position), causes the voice coil 203B to move relative to the fixed position of the second magnet 205B. The sound-generating component 215 of the second speaker 114B may be mounted to the voice coil 203B such that the motion of the voice coil 203B relative to the second magnet 205B cause the sound-generating component 215 of the second speaker 114B to move and generate sound (e.g., project sound in the direction 300).

Because the first magnet 205A is oriented differently from the second magnet 205B, in order to have the first speaker 114A and the second speaker 114B output the same audio content at the same time (e.g., in order to operate the first speaker 114A and the second speaker 114B acoustically in phase), the control current in the voice coil 203A may be different from (e.g., equal in magnitude and opposite in direction to) the control current in the voice coil 203B. For example, as shown in FIG. 3, the control current in the voice coil 203A may be provided in a first direction 304 (e.g., into the page on the left side of the first magnet 205A and out of the page on the right side of the first magnet 205A), and the control current in the voice coil 203B may be provided in a second direction 306 (e.g., out of the page on the left side of the second magnet 205B and out of the page on the right side of the second magnet 205B) that is substantially opposite to the first direction 304. In this way, the control currents in the voice coil 203A and the voice coil 203B may cause the voice coil 203A and the voice coil 203B (e.g., and the respective sound-generating components 215 attached thereto) to move in the same way at the same time (e.g., mechanically in phase), while the magnetic fields generated by the voice coil 203A may be substantially out of phase (e.g., substantially equal in magnitude and opposite in direction, such as one-hundred-and-eighty degrees out of phase) with the magnetic fields generated by the voice coil 203B.

Figure 4:
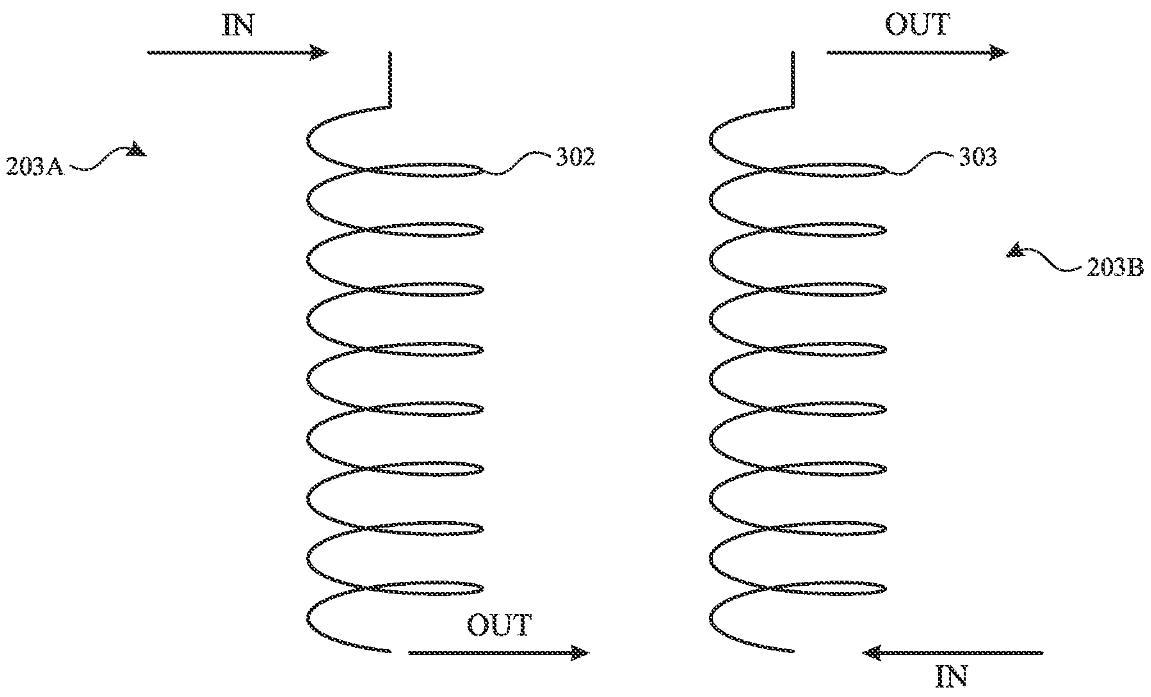
FIG. 4 illustrates example voice coils for speakers in accordance with various aspects of the subject technology.

In various implementations, providing the control currents in the first speaker 114A and the second speaker 114B in substantially opposite directions may be achieved by providing opposite currents to the voice coils 203A and 203B from one or more amplifiers (e.g., from device circuitry 224), or by winding the wire 302 of the voice coil 203A in an opposite direction from the winding direction of the wire 303 of the voice coil 203B. For example, FIG. 4 illustrates an exemplary implementation in which the wire 302 of the voice coil 203A is wound in the same direction as the wire 303 of the voice coil 203B (e.g., both the wire 302 and the wire 303 may be wound in a right-handed winding direction, as in the example of FIG. 4, or both the wire 302 and the wire 303 may be wound in a left-handed winding direction), and the control current is input into each voice coil in an opposite direction (e.g., as controlled by one or more amplifiers, such as amplifiers of the device circuitry 224).

Figure 5:
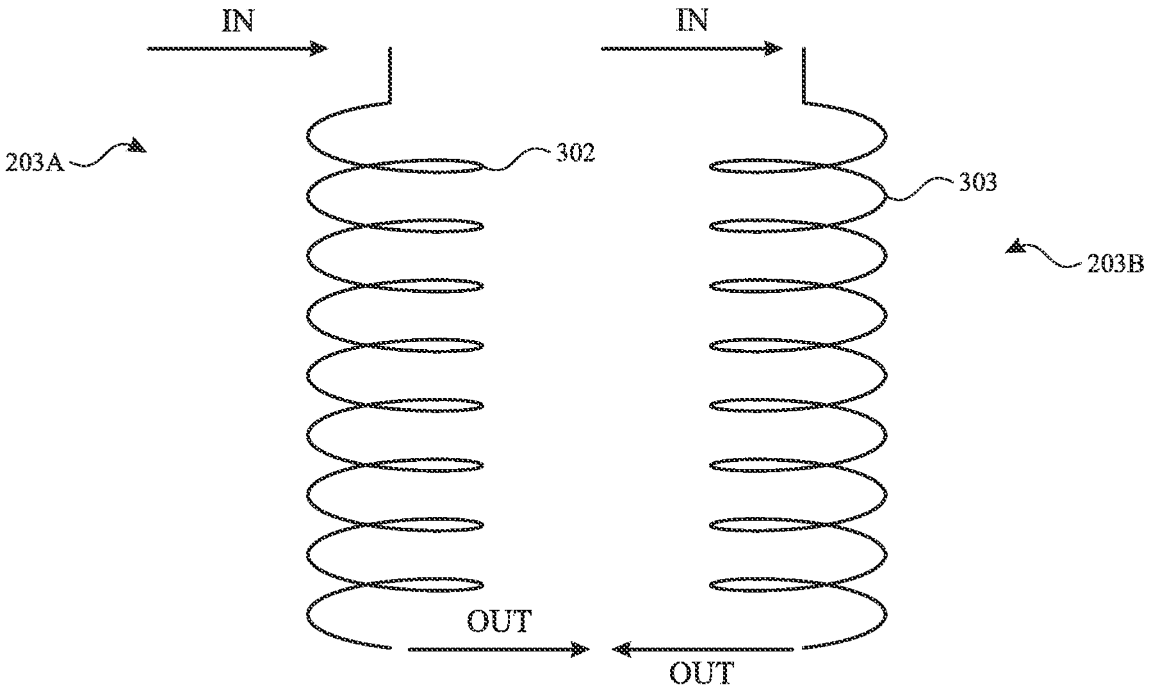
FIG. 5 illustrates another example of voice coils for speakers in accordance with various aspects of the subject technology.

As another example, FIG. 5 illustrates an exemplary implementation in which the wire 302 of the voice coil 203A and the wire 303 of the voice coil 203B are wound in substantially opposite directions. In the example of FIG. 5, the wire 302 of the voice coil 203A is wound in a right-handing winding direction and the wire 303 of the voice coil 203B is wound in a left-handing winding direction. As shown, in this configuration, the same control current may be provided to the voice coil 203A and the voice coil 203B and the substantially reverse (e.g., electrically out of phase) flow of the currents in the voice coil 203A and the voice coil 203B may be caused by the different winding directions of the two voice coils.

Figure 6:
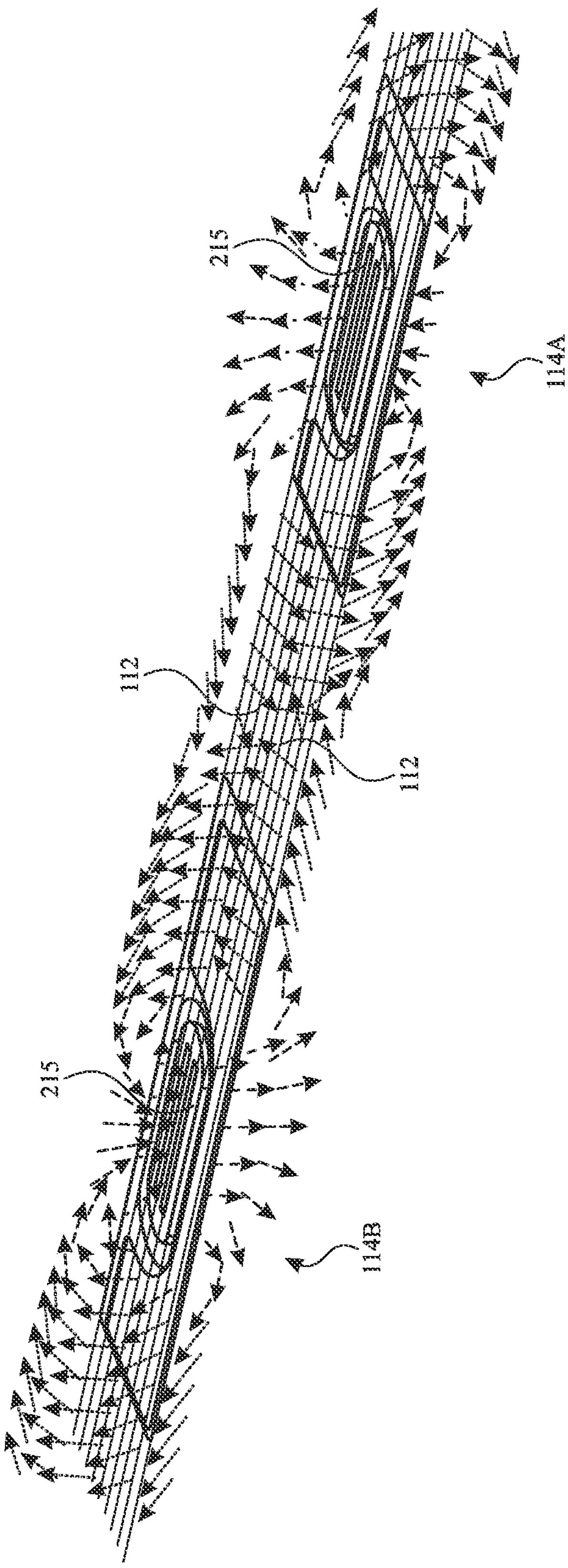
FIG. 6 illustrates magnetic fields that may be generated by speakers mounted adjacent to data lines of a display in accordance with various aspects of the subject technology.

FIG. 6 illustrates an exemplary set of magnetic fields that may be generated by the first speaker 114A and the second speaker 114B in the arrangement of FIG. 3. As shown, the magnetic fields generated by the first speaker 114A (e.g., relative to the first speaker 114A) may be substantially opposite in direction (e.g., and equal in magnitude) to the magnetic fields generated by the second speaker 114B (e.g., relative to the second speaker 114B). In the example of FIG. 6, multiple data lines 112 can be seen passing by (e.g., passing in front of and/or over the sound-generating components 215) of both the first speaker 114A and the second speaker 114B. In this arrangement, any effect generated by the magnetic fields of the first speaker 114A or the second speaker 114B, on the data being transmitted through the data lines 112, may be substantially canceled by the magnetic fields of the other of the first speaker 114A or the second speaker 114B.

In the examples of FIGS. 3-6, the first speaker 114A and the second speaker 114B may be disposed on a common side of the electronic device 100 (e.g., both on the left side or both on the right side) or may both be disposed at or near a center of the electronic device 100. In these examples, the first speaker 114A and the second speaker 114B may be operated to output the same audio content. For example, both of the first speaker 114A and the second speaker 114B may be operated to output a left channel of a stereo output or a spatial output, both of the first speaker 114A and the second speaker 114B may be operated to output a right channel of a stereo output or a spatial output, or both of the first speaker 114A and the second speaker 114B may be operated to output a center channel of a stereo output or a spatial output. In these examples, the first speaker 114A and the second speaker 114B can be operated acoustically and mechanically in phase, and electrically out of phase, as described herein, to output the same audio content.

Figure 7:
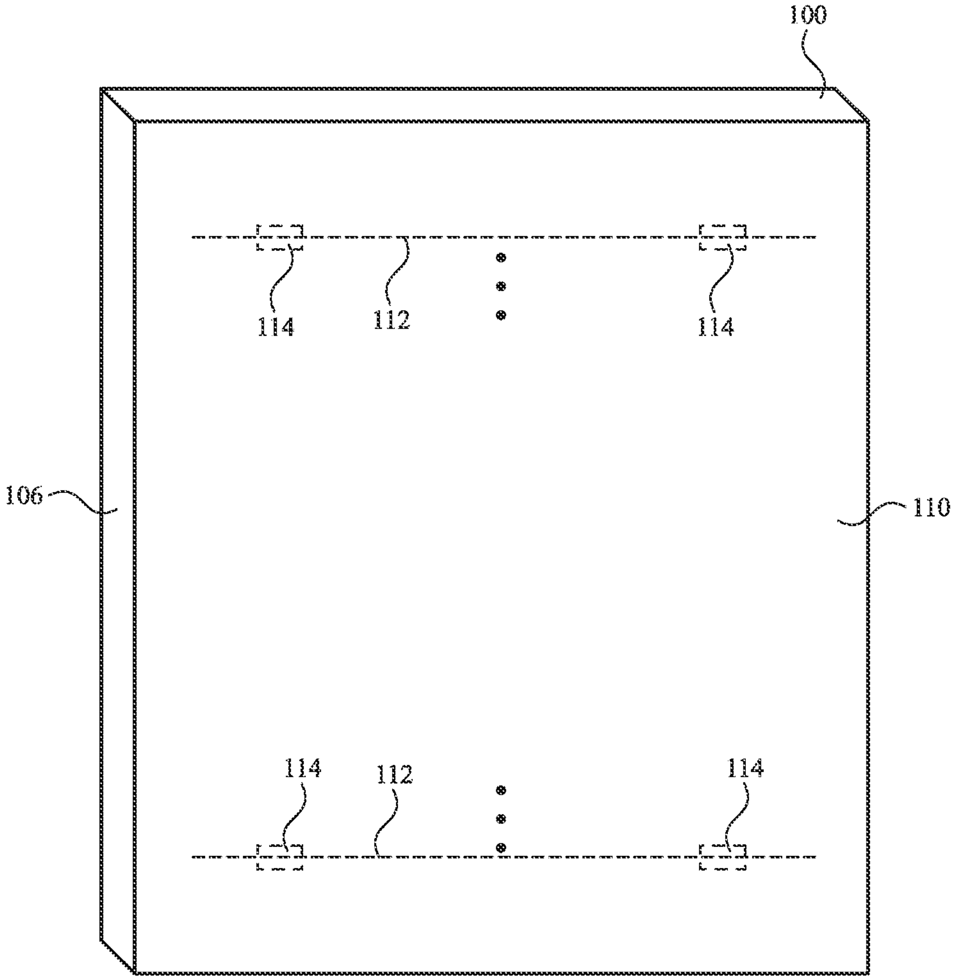
FIG. 7 illustrates the example electronic device of FIG. 1 in a different orientation in accordance with various aspects of the subject technology.

In one or more implementations, an electronic device, such as the electronic device 100, may be rotatable from one orientation (e.g., a portrait or landscape orientation) to another orientation (e.g., a landscape or portrait orientation). For example, FIG. 7 illustrates a use case in which the electronic device 100 is in an orientation that is rotated approximately ninety degrees from the orientation shown in FIG. 1. In one or more implementation, the electronic device 100 may be configured to modify video and/or audio content being output by the electronic device responsive to a change in device orientation. For example, in a use case in which the electronic device of FIG. 1 is outputting video content on the display 110 and audio content from the speakers 114, and is rotated to the orientation of the FIG. 7, the electronic device (e.g., device circuitry 224) may rotate (e.g., and/or adjust the size, resolution, etc.) of the video content on the display 110. In this use case, the electronic device 100 may also modify the outputs of the speakers 114 response to the change in device orientation.

For example, the two rightmost speakers 114 may be outputting a right channel of a stereo output in the orientation of FIG. 1, and the two rightmost speakers 114 may be outputting a right channel of a stereo output in the orientation of FIG. 1. However, when the electronic device 100 is rotated to the orientation of FIG. 7, the output of the speakers 114 may be modified such that the two bottommost speakers 114 of FIG. 1 (e.g., rotated to the right side of the device in FIG. 7) are operated to output a right channel of a stereo output in the orientation of FIG. 7, and the two topmost speakers 114 of FIG. 1 (e.g., rotated to the left side of the device in FIG. 7) are operated to output a left channel of the stereo output.

However, as shown in FIG. 7, the data lines 112 rotate with the electronic device 100. For this reason, if the two speakers 114 adjacent to the same data line are operated to output different audio content, it may be difficult or impossible to operate those two speakers electrically in phase to mitigate the effect of on the data lines 112. In one or more implementations, the electronic device 100 (e.g., device circuitry 224) may further modify the audio content to allow (e.g., continued) mitigation of the interference with the data lines 112 of the display 110 while in the orientation of FIG. 7. For example, magnetic fields that change with a particular frequency, or within a particular frequency range, may be predetermined to be the most likely to interfere with the data lines 112 of the display 110. Accordingly, in one or more implementations, the electronic device 100 may modify a portion, such as a frequency band, of a left channel and a right channel of a stereo output to form a mono channel in that frequency band. The mono channel within that frequency band may then be output by both of the speakers 114 that are adjacent to the same data line 112 (e.g., even when those speakers are disposed on the left and right sides of the electronic device 100), so that, at least in that frequency band, the two speakers 114 that are adjacent to the same data line 112 can be operated acoustically and mechanically in phase, and electrically out of phase. In one or more implementations, other portions, such as other frequency bands, of the stereo output may remain split (e.g., left and right) between the two speakers 114 along the same data line 112.

In one or more implementations, if two different channels of audio content that are being output by two speakers 114 that are adjacent to the same data line 112 are highly correlated (e.g., for a scene in a video in which the source of sound is directly in front of or behind the viewer), the electronic device 100 may operate the two speakers 114 that are adjacent to the same data line 112 acoustically and mechanically in phase, and electrically out of phase, without modifying the audio content of the two different channels.

Figure 8:
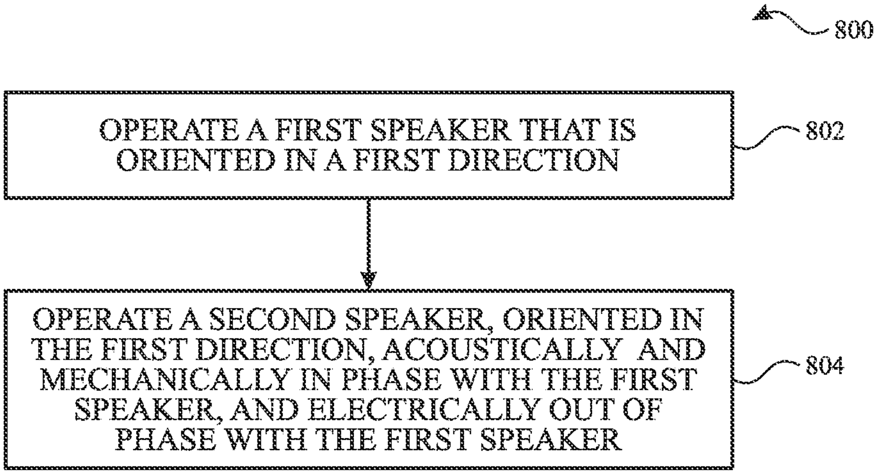
FIG. 8 illustrates a flow chart of illustrative operations that may be performed for operating an acoustic transducer system in an electronic device with a display in accordance with various aspects of the subject technology.

FIG. 8 illustrates a flow diagram of an example process for operating an acoustic transducer system of an electronic device having a display, in accordance with one or more implementations. For explanatory purposes, the process 800 is primarily described herein with reference to the electronic device 100 of FIGS. 1 and 2. However, the process 800 is not limited to the electronic device 100 of FIGS. 1 and 2, and one or more blocks (or operations) of the process 800 may be performed by one or more other components and other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In the example of FIG. 8, at block 802, a first speaker (e.g., first speaker 114A) that is oriented in a first direction (e.g., direction 300) may be operated (e.g., by an electronic device, such as electronic device 100, in which the first speaker is disposed). For example, the first speaker may include a first magnet (e.g., first magnet 205A) oriented in a first polar orientation. For example, the first polar orientation may be defined by a north (N) pole of the first magnet being closer to a diaphragm (e.g., sound-generating component 215) of the first speaker than a south (S) pole of the first magnet is to the diaphragm. For example, operating the first speaker may include projecting, by the first speaker that is oriented in the first direction, sound corresponding to audio content primarily in the first direction.

At block 804, a second speaker (e.g., second speaker 114B), oriented in the first direction (e.g., direction 300), may be operated acoustically and mechanically in phase with the first speaker, and electrically out of phase with the first speaker. For example, the second speaker may include a second magnet (e.g., second magnet 205B) oriented in second polar orientation substantially opposite to the first polar orientation (e.g., as described herein in connection with FIG. 3). For example, the second polar orientation may be defined by a north (N) pole of the first magnet being further from a diaphragm (e.g., sound-generating component 215) of the second speaker than a south(S) pole of the second magnet is to the diaphragm. For example, operating the second speaker may include projecting, by the second speaker that is oriented in the first direction, additional sound corresponding to the audio content primarily in the first direction.

In one or more implementations, the first speaker may have a first voice coil that is wound in a first direction, and the second speaker may have a second voice coil that is wound in a second direction substantially opposite to the first direction (e.g., to operate the second speaker acoustically and mechanically in phase with the first speaker, and electrically out of phase with the first speaker), such as in the example of FIG. 5. In one or more other implementations, the first speaker may have a first voice coil that is wound in a first direction, the second speaker may have a second voice coil that is wound in the first direction (e.g., as in the example of FIG. 4), and a current may be provided through the first voice coil (e.g., by an amplifier) in a direction that is substantially opposite to the first direction (e.g., to operate the second speaker acoustically and mechanically in phase with the first speaker, and electrically out of phase with the first speaker).

In one or more implementations, while operating the first speaker and the second speaker, a display (e.g., display 110) including at least one data line (e.g., data line 112) that passes by (e.g., in front of) the first speaker and the second speaker may also be operated (e.g., to output video content corresponding to audio content being output by the first speaker and the second speaker, such as an audio track of a video file for which a video track is being displayed). For example, operating the second speaker electrically out of phase with the first speaker may mitigate an electromagnetic interference, by the first speaker (e.g., by electromagnetic fields generated by operating the first speaker), with the display.

In one or more implementations, operating the second speaker electrically and mechanically in phase with the first speaker, and electrically out of phase with the first speaker may include passing a first current through a first voice coil of the first speaker in a first current direction, and passing a second current through a second voice coil of the second speaker in a second current direction (e.g., as described herein in connection with FIGS. 3, 4, and/or 5).

In one or more implementations, operating the first speaker and the second speaker may include operating the first speaker and the second speaker to output a first channel of a stereo output while a device including the first speaker and the second speaker is in a first orientation (e.g., the orientation depicted in FIG. 1). In one or more implementations, the process 800 may also include modifying, responsive to a change in an orientation of the device from the first orientation to a second orientation (e.g., the orientation of FIG. 7, such as a second orientation that is rotated by approximately ninety degrees relative to the first orientation), the operating of the first speaker to output a portion of a second channel of the stereo output. For example, the change in orientation may cause the first speaker to be rotated from one side (e.g., a right side or a left side) of the electronic device (e.g., relative to a user of the electronic device) to another side (e.g., a left side or a right side) of the electronic device, and to correspondingly output at least a portion of a different channel (e.g., a left channel or a right channel) based on the different location of the first speaker (e.g. relative to a user of a device including the first speaker and the second speaker).

In one or more implementations, responsive to the change in orientation: another portion of the second channel of the stereo output may be modified to generate a mono output. The first speaker and the second speaker may be operated to output the mono output (e.g., while the electronic device is in the second orientation). In this way, even in an orientation in which the first speaker and the second speaker are disposed on different sides of the electronic device (e.g., and partially outputting different channels of audio content), at least a portion of the operation of the first speaker and the second speaker (e.g., a portion corresponding to the mono output) can remain acoustically and mechanically in phase, and electrically out of phase. For example, the portion of the second channel may include a first frequency band of the second channel, and the other portion of the second channel may include a second frequency band of the second channel. For example, the second frequency band may include one or more frequencies predetermined to affect a display of a device (e.g., electronic device 100) including the first speaker and the second speaker.

In one or more implementations, the process 800 may also include identifying the other portion of the stereo output based on audio content in the stereo output. For example, the electronic device 100 may determine that the audio content in the first channel is substantially uncorrelated with the audio content in the second channel. The electronic device may then identify the other portion of the stereo output in the second frequency band for modification, responsive to determining that the first channel is substantially uncorrelated with the audio content in the second channel (e.g., and that the operation of the first speaker and the second speaker would resultingly not be one-hundred-and-eighty degrees out of phase). A portion of the audio content of the first channel (e.g., a portion in the second frequency band) may also be modified to the mono output. In another example, the electronic device may determine that the audio content in the first channel is highly correlated with the audio content in the second channel, and may operate the first speaker to output the second channel (e.g., without modification) and operate the second speaker to output the first channel (e.g., without modification).

Figure 9:
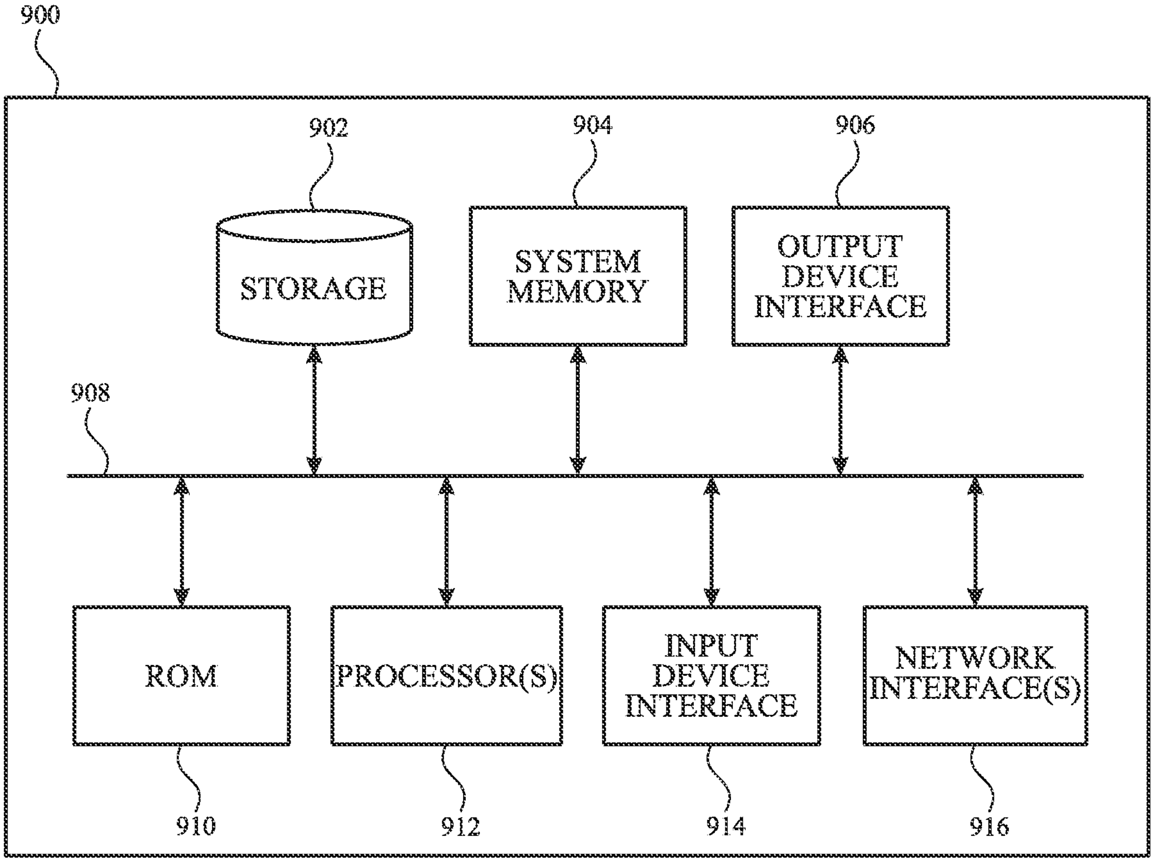
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, one or more of the electronic device 100 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, microphones, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with some aspects of the subject disclosure, an electronic device is provided that includes a first speaker having a first magnet and a first voice coil, and configured to output audio in a first direction; and a second speaker having a second magnet and a second voice coil, and configured to output audio in the first direction, in which the first magnet has a first polar orientation that is substantially opposite to a second polar orientation of the second magnet.

In accordance with other aspects of the subject disclosure, a method is provided that includes operating a first speaker that is oriented in a first direction; and operating a second speaker, oriented in the first direction, acoustically and mechanically in phase with the first speaker, and electrically out of phase with the first speaker.

In accordance with other aspects of the subject disclosure, an electronic device is provided that includes a display including a plurality of data lines; a first speaker disposed adjacent to the plurality of data lines; a second speaker disposed adjacent to the plurality of data lines; and processing circuitry configured to operate the second speaker electrically and mechanically in phase with the first speaker, and electrically out of phase with the first speaker.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device, comprising:
- a first speaker having a first magnet and a first voice coil, mounted adjacent to at least one data line for a display of the electronic device, and configured to output audio in a first direction; and
- a second speaker having a second magnet and a second voice coil, configured to output audio in the first direction and mounted, laterally offset from the first speaker in a direction substantially perpendicular to the first direction, adjacent to the at least one data line for the display,
- wherein the first magnet has a first polar orientation that is substantially opposite to a second polar orientation of the second magnet.

2. The electronic device of claim 1, further comprising the at least one data line.

3. The electronic device of claim 1, further comprising processing circuitry configured to operate the first speaker and the second speaker to output the same audio content.

4. The electronic device of claim 3, wherein the processing circuitry is configured to operate the first speaker and the second speaker to output the same audio content in acoustic phase.

5. The electronic device of claim 4, wherein the processing circuitry is configured to operate the first speaker and the second speaker in mechanical phase to output the same audio content.

6. The electronic device of claim 5, wherein the processing circuitry is configured to operate the first speaker and the second speaker electrically out of phase to output the same audio content.

7. The electronic device of claim 6, wherein the processing circuitry is configured to operate the first speaker and the second speaker electrically out of phase to output the same audio content by providing a first current through the first voice coil in a first direction, and by providing a second current through the second voice coil in a second direction opposite to the first direction.

8. The electronic device of claim 7, wherein the first voice coil comprises a plurality of windings, wound in a first winding direction, and wherein the second voice coil comprises a second plurality of windings, wound in the first direction.

9. The electronic device of claim 1, wherein the first voice coil comprises a plurality of windings, wound in a first winding direction, and wherein the second voice coil comprises a second plurality of windings, wound in a second winding direction substantially opposite to the first winding direction.

10. The electronic device of claim 1, wherein the first speaker comprises a first diaphragm coupled to the first voice coil and separated from the display by an air gap, the second speaker comprises a second diaphragm separate from the first diaphragm, the second diaphragm coupled to the second voice coil and separated from the display by an air gap, and wherein the first polar orientation and the second polar orientation are both parallel to the first direction.

11. A method, comprising:
- operating a first speaker that is oriented in a first direction and mounted adjacent to at least one data line for a display of the electronic device; and
- operating a second speaker, oriented in the first direction and mounted adjacent to the at least one data line for the display and laterally offset from the first speaker in a direction substantially perpendicular to the first direction, acoustically and mechanically in phase with the first speaker, and electrically out of phase with the first speaker.

12. The method of claim 11, wherein the first speaker comprises a first magnet oriented in a first polar orientation, and wherein the second speaker comprises a second magnet oriented in second polar orientation substantially opposite to the first polar orientation.

13. The method of claim 12, wherein operating the second speaker electrically and mechanically in phase with the first speaker, and electrically out of phase with the first speaker comprises passing a first current through a first voice coil of the first speaker in a first current direction, and passing a second current through a second voice coil of the second speaker in a second current direction.

14. The method of claim 11, further comprising, while operating the first speaker and the second speaker, operating a display comprising at least one data line that passes by the first speaker and the second speaker, wherein operating the second speaker electrically out of phase with the first speaker mitigates an electromagnetic interference, by the first speaker and the second speaker, with the display.

15. The method of claim 11, wherein operating the first speaker and the second speaker comprises operating the first speaker and the second speaker to output a first channel of a stereo output while a device comprising the first speaker and the second speaker is in a first orientation.

16. The method of claim 15, further comprising:
- modifying, responsive to a change in an orientation of the device from the first orientation to a second orientation, the operating of the first speaker to output a portion of a second channel of the stereo output.

17. The method of claim 16, further comprising, responsive to the change in orientation:
- modifying an other portion of the second channel of the stereo output to generate a mono output; and operating the first speaker and the second speaker to output the mono output.

18. The method of claim 17, wherein the portion of the second channel comprises a first frequency band of the second channel, and wherein the other portion of the second channel comprises a second frequency band of the second channel, wherein the second frequency band comprises one or more frequencies predetermined to affect a display of a device comprising the first speaker and the second speaker.

19. The method of claim 17, further comprising identifying the other portion of the stereo output based on audio content in the stereo output.

20. The method of claim 11, further comprising:

projecting, by the first speaker that is oriented in the first direction, sound corresponding to audio content primarily in the first direction; and projecting, by the second speaker that is oriented in the first direction, additional sound corresponding to the audio content primarily in the first direction.

21. An electronic device, comprising:

a display comprising a plurality of data lines;

a first speaker disposed adjacent to the plurality of data lines;

a second speaker disposed adjacent to the plurality of data lines and laterally offset from the first speaker; and processing circuitry configured to operate the second speaker electrically and mechanically in phase with the first speaker, and electrically out of phase with the first speaker.

22. The electronic device of claim 21, wherein the first speaker and the second speaker are oriented, respectfully, in a first direction and a second direction parallel to the first direction, wherein the first speaker comprises a first magnet having a first polar orientation, and wherein the second speaker comprises a second polar orientation antiparallel to the first polar orientation.

* * * * *